Aug. 17, 1948.  E. P. BARBER  2,447,153
MACHINE FOR MANUFACTURING CEMENT TILE
Filed Nov. 13, 1945  2 Sheets-Sheet 1
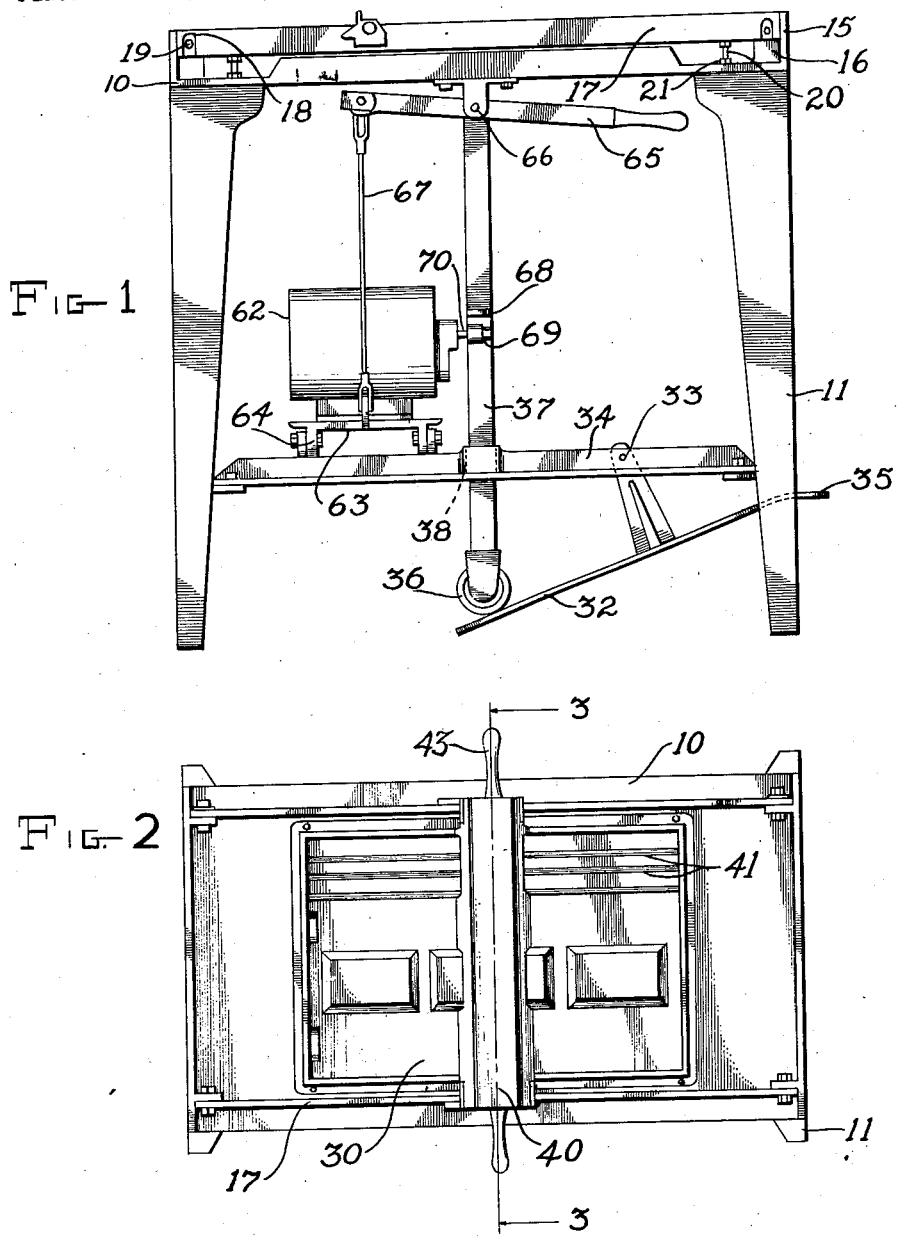
ETHEL P. BARBER
INVENTOR
BY *Lyon & Lyon*
ATTORNEYS

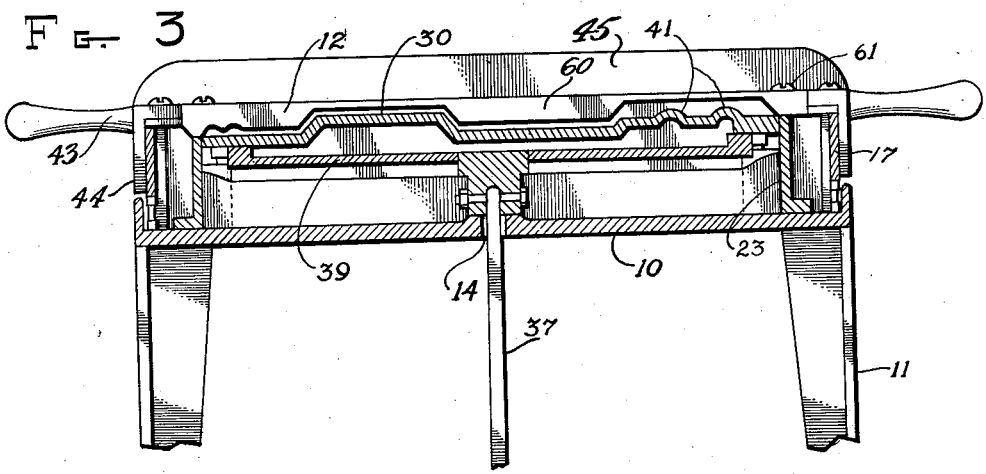
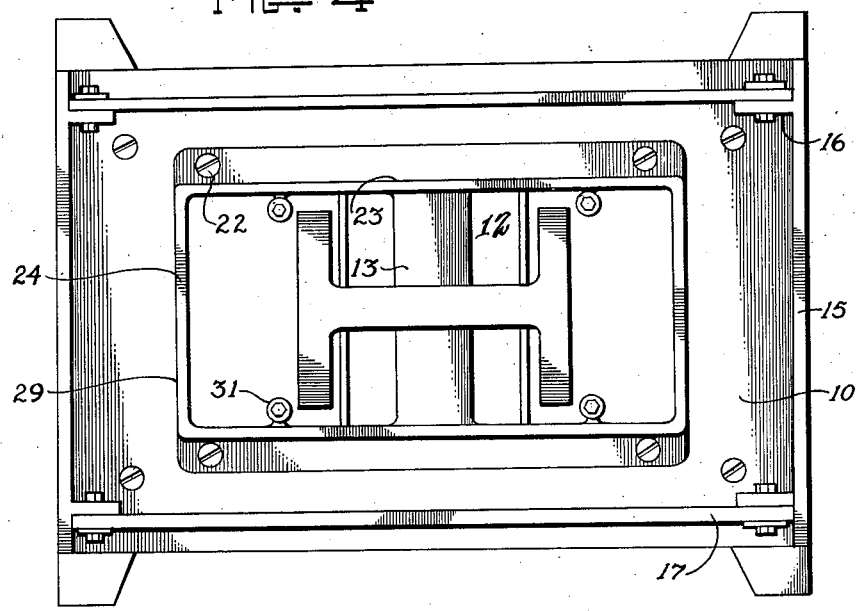

Patented Aug. 17, 1948

2,447,153

UNITED STATES PATENT OFFICE 2,447,153

MACHINE FOR MANUFACTURING CEMENT TILE

Ethel P. Barber, Phoenix, Ariz.

Application November 13, 1945, Serial No. 628,057

2 Claims. (Cl. 25—43)

My invention relates to a machine for manufacturing cement tile, and more specifically to a machine for manufacturing cement tile that is used in roofing. In general my invention comprises a device in which pallets are set in a frame, cement is placed thereon, shaken down so as to settle to fill the crevices of the pallet, trowelled on the upper side and the pallets then lifted out and set aside while the cement sets. By the use of such a machine and a plurality of pallets, a great many tile can be made by one workman, one after another, without the necessity of the cement setting before removing from the machine.

Another object of my invention is to provide a roof tile making machine capable of being readily adjusted so as to produce tiles of different thicknesses and further to produce simple and efficient pedally actuated means to lift the tile carrying pallet from the mold cavity after the tile has been formed on said pallet.

Other objects and advantages of my invention will be apparent from the following description of the preferred embodiments thereof.

In the drawings:

Figure 1 is a side elevation of my invention.

Figure 2 is a top plan view.

Figure 3 is a cross section taken on the line 3—3 of Figure 2.

Figure 4 is a plan view of my invention with the pallet, trowel, and mold cavity walls removed.

Referring by numerals to the accompanying drawings which illustrate a preferred embodiment of my invention, 10 designates a bed plate, supported by legs 11 and provided with a pair of centrally disposed rectangular openings 12, divided by a lateral rail 13, having at or near its center an aperture 14.

Projecting upwardly from the ends of plate 10 are transverse flanges 15 and projecting inwardly therefrom, near their ends are plates 16, against the inner faces of which bear the ends of longitudinally disposed bars 17, which provide guides and supports for the trowel as it is moved over the pallet.

In order that the bars 17 may be adjusted vertically to regulate the horizontal plane in which the trowel travels, said bars are provided near their ends with vertically disposed slots 18 through which pass bolts 19 and the latter being seated in the plates 16.

To support the bars 17 after vertical adjustment, their lower edges rest on the heads of bolts 20 which are screw seated in plate 10 beneath said bars and said bolts carrying nuts 21 which engage the upper face of the bed plate to lock the bolts in their adjusted positions.

Suitably secured on top of the bed plate 10, by bolts 22 or otherwise, is a rectangular frame comprising side rails 23 and end rails 24, the side rails 23 of which frame are disposed between and parallel with the bars 17 and the outer edges of the openings 12. The inner faces of the rails 23 and 24 form the side walls of the mold cavity.

The upper edges of the end rails 24 are notched as designated by 29 to conform to the cross sectional contour of the tiles formed in the machine and which contour may differ as desired.

A rectangular plate, preferably of metal and contoured as desired, forms the pallet 30 on which the tiles are formed; and this pallet is arranged for vertical movement in the upper portion of the mold cavity with its edges lying very close to the inner faces of the rails 23 and 24.

Screws 31, seated in bed plate 10 near the end walls 24, provide means for supporting the pallet at different elevations within the mold cavity.

The pedally actuated pallet lifting means includes a lever 32, fulcrummed at 33 to a horizontally disposed frame 34, connected to the lower portions of the legs 11, and carried on the outer end of this lever is a tread plate 35.

The inner end of lever 32 is positioned beneath a roller 36, the latter being mounted on the lower end of an upright bar 37, which bar passes through a bearing 38 in frame 34 and through aperture 14 in rail 13.

The upper end of bar 37 carries a horizontally disposed H-shaped frame 39 which occupies a position between the pallet and the base plate. Normally frame 39 occupies a position a short distance beneath pallet 30.

The trowel, used for pressing the concrete into the mold cavity and giving shape to the upper face of the tile while same is being formed, comprises a metal bar 40, the ends of which are formed into handles 41 and depending from said bar inwardly from the handles are fingers 42, which bear against the outer faces of the trowel, supporting and guiding rails 17. Thus, the trowel travels in a definite path when moved lengthwise of rails 17.

A feature of my invention is that the pallet 30 has a form which gives to the roof tile a parallel series of grooves. This is provided by forming parallel ridges 41 in the pallet. At the same time the trowel 40 has a series of grooves 42 which form ridges in the top side of the tile. By placing the grooves 42 near one rail 23 and the ridges 41 near the opposite rail 23, the tile manufactured thereby will have means for interlocking the tile together to form a continuous roof.

While a trowel could be made of one piece of metal, the wear occasioned by its use upon concrete would cause a deterioration in the quality of the tiles made therefrom. I, therefore, prefer to form the trowel in two pieces. The handles 43 and main support 45 and legs 44 are formed in one piece of aluminum, and the trowel proper 60 is formed of steel or iron and bolted at 61 to the support 45. By this construction any wear on the trowel 60 is remedied by replacing the same on the support 40.

In the use of my improved tile making machine, plastic, concrete or the like is placed in the mold cavity; and the trowel is now moved lengthwise of the mold and at the same time, said trowel is lifted slightly from the bars and then hammered downwardly onto said bars, thereby, in effect ramming the mold to eliminate any voids or air pockets in the concrete.

Finally, the trowel is moved two or three times lengthwise of the mold to smooth the upper face of the concrete therein and give said face the desired contour.

After the trowel has been drawn to a position beyond either end of the mold, the operator's foot swings lever 32 on its axis by pressure on tread plate 35, thus elevating bar 37 and the frame 39 engages pallet and lifts same, carrying the molded tile upwardly out of the mold. The pallet and tile are now removed from the frame and delivered to the drying rack.

Removal of pressure on the tread plate, permits the lever 32, upright 37, and frame 34 to return by gravity to their normal positions and another pallet is now placed on said frame and the molding operation repeated.

To provide a more satisfactory method of eliminating voids and air pockets in the concrete, an electric motor 62 is supported upon the bracket 63 attached to the frame 34 by the hinges 64. A hand lever 65 has a fulcrum 66 bolted to the bed plate 10 and connects to a rod 67 attached to the bracket 63. A flat cam rider 68 is bolted to the bar 37 adjacent to the cam 69 mounted upon the shaft 70 of the motor 62. The cam 69 and rider 68 do not contact when in their normal position; but when the lever 65 is raised, it causes the bracket 63 to pivot on the hinges 64, raising the motor 62 and causing cam and rider to contact. As the motor revolves, the bar 37 is reciprocated up and down, causing a shaking of the pallet 30 which eliminates voids and air pockets in the concrete.

Thus, it will be seen that I have provided a roof tile molding machine which is simple in structure, inexpensive of manufacture, and very effective in performing the functions for which it is intended.

It will be understood that minor changes in the size, form, and construction of the various parts of my improved tile molding machine may be made and substituted for those herein shown and described without departing from the spirit of my invention, the scope of which is set forth in the appended claims.

I claim:

1. In a machine of the class described, a bed plate with a centrally arranged opening, side and end rails surrounding said opening, said side rails having their upper edges parallel to act as a guide, stop attached to said bed plate and positioned within said opening to support a pallet, said pallet and rails acting as a mold for concrete, a trowel adapted to slide on said side rails to form the upper surface to concrete positioned in said mold, and means for lifting said pallet from said opening, a frame supporting said bed plate and said means for lifting said pallet, a motor mounted upon said frame by hinge means, a cam upon said motor shaft, a cam rider attached to said means for lifting said pallet, lever means for raising said motor to bring said cam and said rider into contact whereby rotation of said motor will move said lifting means up and down and impart a jarring action to said pallet.

2. In a machine of the class described, a bed plate with a centrally arranged opening, side and end rails surrounding said opening, said side rails having their upper edges parallel to act as a guide, stop attached to said bed plate and positioned within said opening to support a pallet, said pallet and rails acting as a mold for concrete, a trowel adapted to slide on said side rails to form the upper surface to concrete positioned in said mold, and means for lifting said pallet from said opening, said pallet formed to provide a pattern upon the lower side of the concrete in said mold and said trowel formed to impress a complementary pattern on the top of said concrete whereby the tile manufactured by said machine will interlock, a frame supporting said bed plate and said means for lifting said pallet, a motor mounted upon said frame by hinge means, a cam upon said motor shaft, a cam rider attached to said means for lifting said pallet, lever means for raising said motor to bring said cam and said rider into contact whereby rotation of said motor will move said lifting means up and down and impart a jarring action to said pallet.

ETHEL P. BARBER.

REFERENCES CITED

The following references are of record in the file of this patent:

UNITED STATES PATENTS

| Number | Name | Date |
| --- | --- | --- |
| 1,605,801 | Warren | Nov. 2, 1926 |
| 1,717,996 | Moore, Jr. | June 18, 1929 |
| 2,389,673 | Lofdahl | Nov. 27, 1945 |